(12) United States Patent
Shivak et al.

(10) Patent No.: US 11,071,247 B2
(45) Date of Patent: Jul. 27, 2021

(54) IMPLEMENT FOR ADJUSTABLY METERING AN AGRICULTURAL FIELD INPUT ACCORDING TO DIFFERENT FRAME SECTIONS

(71) Applicant: Raven Industries, Inc., Sioux Falls, SD (US)

(72) Inventors: Stanislaus Montgomery Shivak, Stockholm (CA); Jared Ernest Kocer, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 16/731,325

(22) Filed: Dec. 31, 2019

(65) Prior Publication Data

US 2020/0214193 A1    Jul. 9, 2020

Related U.S. Application Data

(63) Continuation of application No. 15/821,113, filed on Nov. 22, 2017, now Pat. No. 10,568,257, which is a
(Continued)

(51) Int. Cl.
*A01C 7/08* (2006.01)
*A01C 7/04* (2006.01)
(Continued)

(52) U.S. Cl.
CPC ............... *A01C 7/081* (2013.01); *A01C 7/04* (2013.01); *A01C 7/042* (2013.01); *A01C 7/082* (2013.01);
(Continued)

(58) Field of Classification Search
CPC .. A01C 7/081; A01C 7/08; A01C 7/00; A01C 7/102; A01C 7/10; A01C 23/007;
(Continued)

(56) References Cited

U.S. PATENT DOCUMENTS 1,582,986 A    5/1926    Frank
3,197,299 A    7/1965    Bosse et al.
(Continued)

FOREIGN PATENT DOCUMENTS

AU    725448    10/2000
AU    2004219715    9/2004
(Continued)

OTHER PUBLICATIONS

U.S. Appl. No. 13/776,285 U.S. Pat. No. 9,113,591, filed Feb. 25, 2013, Implement for Adjustably Metering an Agricultural Field Input According to Different Frame Sections.
(Continued)

*Primary Examiner* — Christopher J. Novosad
(74) *Attorney, Agent, or Firm* — Schwegman Lundberg & Woessner, P.A.

(57) ABSTRACT

Metering devices for an agricultural implement are present for applying a field input, for example, pneumatically delivered granular product including seed or fertilizer or sprayed liquid product including fertilizer and the like, to an agricultural field. In the applying of the field input, the rate of application of the dispensers of one section of the implement can be collectively varied in relation to the rate of application of the dispensers of a different section of the implement frame.

28 Claims, 5 Drawing Sheets

Related U.S. Application Data continuation of application No. 14/727,535, filed on Jun. 1, 2015, now Pat. No. 9,894,829, which is a continuation of application No. 13/776,285, filed on Feb. 25, 2013, now Pat. No. 9,113,591.

(60) Provisional application No. 61/661,181, filed on Jun. 18, 2012.

(51) Int. Cl.

| | | |
|---|---|---|
| B05B 1/16 | (2006.01) | |
| A01C 23/04 | (2006.01) | |
| G05D 7/06 | (2006.01) | |
| B05B 9/04 | (2006.01) | |
| G05D 11/00 | (2006.01) | |
| A01C 21/00 | (2006.01) | |
| A01C 7/20 | (2006.01) | |
| A01C 23/00 | (2006.01) | |
| A01C 7/10 | (2006.01) | |

(52) U.S. Cl.
CPC ............... *A01C 7/084* (2013.01); *A01C 7/20* (2013.01); *A01C 21/005* (2013.01); *A01C 23/042* (2013.01); *B05B 1/169* (2013.01); *B05B 1/1681* (2013.01); *B05B 9/0406* (2013.01); *B05B 9/0423* (2013.01); *G05D 7/0605* (2013.01); *G05D 7/0641* (2013.01); *G05D 7/0652* (2013.01); *G05D 7/0664* (2013.01); *G05D 11/003* (2013.01); *A01C 7/102* (2013.01); *A01C 23/007* (2013.01)

(58) Field of Classification Search
CPC ........... A01C 23/00; A01C 7/04; A01C 7/042; A01C 7/082; A01C 7/084; A01C 7/20; A01C 21/005; A01C 21/00; A01C 23/04; B05B 1/1681; B05B 1/16; B05B 1/14; B05B 1/00; B05B 1/169; B05B 9/0406; B05B 9/0403; B05B 9/04; B05B 9/03; B05B 9/00; B05B 9/0423; G05D 7/0605; G05D 7/06; G05D 7/00; G05D 7/0641; G05D 7/0635; G05D 7/0629; G05D 7/0617; G05D 7/0652; G05D 7/0664; G05D 11/003; G05D 11/00

See application file for complete search history.

(56) References Cited

U.S. PATENT DOCUMENTS

| | | | |
|---|---|---|---|
| 3,770,198 | A | 11/1973 | Mihara |
| 3,955,795 | A | 5/1976 | Neely |
| 4,398,605 | A | 8/1983 | Conklin et al. |
| 4,530,463 | A | 7/1985 | Hiniker et al. |
| 4,582,085 | A | 4/1986 | Hafner et al. |
| 4,632,358 | A | 12/1986 | Orth et al. |
| 4,803,626 | A | 2/1989 | Bachman et al. |
| 5,134,961 | A | 8/1992 | Giles et al. |
| 5,285,814 | A | 2/1994 | Pettersson et al. |
| 5,337,959 | A | 8/1994 | Boyd |
| 5,475,614 | A | 12/1995 | Tofte et al. |
| 5,479,812 | A | 1/1996 | Juntunen et al. |
| 5,496,100 | A | 3/1996 | Schmid |
| 5,503,366 | A | 4/1996 | Zabeck et al. |
| 5,520,333 | A | 5/1996 | Tofte |
| 5,635,911 | A | 6/1997 | Landers et al. |
| 5,649,687 | A | 7/1997 | Rosas et al. |
| 5,653,389 | A | 8/1997 | Henderson et al. |
| 5,703,554 | A | 12/1997 | Polgar et al. |
| 5,704,546 | A | 1/1998 | Henderson et al. |
| 5,772,114 | A | 6/1998 | Hunter |
| 5,785,246 | A | 7/1998 | King et al. |
| 5,801,948 | A | 9/1998 | Wood et al. |
| 5,864,781 | A | 1/1999 | White |
| 5,881,919 | A | 3/1999 | Womac et al. |
| 5,883,383 | A | 3/1999 | Dragne |
| 5,884,224 | A | 3/1999 | McNabb et al. |
| 5,897,600 | A | 4/1999 | Elmore et al. |
| 5,884,205 | A | 5/1999 | Elmore et al. |
| 5,911,362 | A | 6/1999 | Wood et al. |
| 5,913,915 | A | 6/1999 | McQuinn |
| 5,919,242 | A | 7/1999 | Greatline et al. |
| 5,924,371 | A | 7/1999 | Flamme et al. |
| 5,931,882 | A | 8/1999 | Fick et al. |
| 5,936,234 | A | 8/1999 | Thomas et al. |
| 5,938,071 | A | 8/1999 | Sauder |
| 5,941,303 | A | 8/1999 | Gowan et al. |
| 5,967,066 | A | 10/1999 | Giles et al. |
| 5,969,340 | A | 10/1999 | Dragne et al. |
| 5,971,294 | A | 10/1999 | Thompson et al. |
| 5,978,723 | A | 11/1999 | Hale et al. |
| 6,009,354 | A | 12/1999 | Flamme et al. |
| 6,012,996 | A | 1/2000 | Lo |
| 6,029,907 | A | 2/2000 | McKenzie |
| 6,070,538 | A | 6/2000 | Flamme et al. |
| 6,070,539 | A | 6/2000 | Flamme et al. |
| 6,079,340 | A | 6/2000 | Flamme et al. |
| 6,086,042 | A | 7/2000 | Scott et al. |
| 6,093,926 | A | 7/2000 | Mertins et al. |
| 6,112,999 | A | 9/2000 | Fingleton et al. |
| 6,122,581 | A | 9/2000 | McQuinn |
| 6,145,455 | A | 11/2000 | Gust et al. |
| 6,149,071 | A | 11/2000 | Maccallummhor et al. |
| 6,189,466 | B1 | 2/2001 | Sinclair et al. |
| 6,189,807 | B1 | 2/2001 | Miller et al. |
| 6,196,473 | B1 | 3/2001 | Beeren et al. |
| 6,199,000 | B1 | 3/2001 | Keller et al. |
| 6,209,563 | B1 | 4/2001 | Seid et al. |
| 6,216,614 | B1 | 4/2001 | Wollenhaupt |
| 6,230,091 | B1 | 5/2001 | McQuinn et al. |
| 6,236,924 | B1 | 5/2001 | Motz et al. |
| 6,240,861 | B1 | 6/2001 | Memory |
| 6,250,564 | B1 | 6/2001 | Chahley |
| 6,269,757 | B1 | 8/2001 | Kiest |
| 6,285,938 | B1 | 9/2001 | Lang et al. |
| 6,305,583 | B1 | 10/2001 | Ward et al. |
| 6,373,057 | B1 | 4/2002 | Penfold |
| 6,486,761 | B1 | 11/2002 | Czarnetzki et al. |
| 6,522,948 | B1 | 2/2003 | Benneweis |
| 6,533,334 | B1 | 3/2003 | Bonn |
| 6,584,920 | B1 | 7/2003 | Cresswell |
| 6,598,944 | B1 | 7/2003 | Wolff et al. |
| 6,606,542 | B2 | 8/2003 | Hauwiller et al. |
| 6,661,514 | B1 | 12/2003 | Tevs et al. |
| 6,678,580 | B2 | 1/2004 | Benneweis |
| 6,698,368 | B2 | 3/2004 | Cresswell |
| 6,708,080 | B2 | 3/2004 | Benneweis |
| 6,755,390 | B2 | 6/2004 | Masuda et al. |
| 6,776,355 | B2 | 8/2004 | Ringer et al. |
| 6,851,377 | B2 | 2/2005 | Mayerle et al. |
| 6,853,276 | B2 | 2/2005 | Smith |
| 6,877,675 | B2 | 4/2005 | Benneweis |
| 6,877,717 | B2 | 4/2005 | Collins et al. |
| 6,959,907 | B2 | 11/2005 | Hironaka |
| 6,994,406 | B1 | 2/2006 | Krawczyk et al. |
| 7,124,964 | B2 | 10/2006 | Bui |
| 7,147,241 | B2 | 12/2006 | Beaujot et al. |
| 7,152,540 | B1 | 12/2006 | Sauder et al. |
| 7,156,322 | B1 | 1/2007 | Heitzman et al. |
| 7,162,961 | B2 | 1/2007 | Grimm |
| 7,195,027 | B2 | 3/2007 | Goossens et al. |
| 7,243,899 | B2 | 7/2007 | Acar et al. |
| 7,311,004 | B2 | 12/2007 | Giles |
| 7,347,221 | B2 | 3/2008 | Berger et al. |
| 7,395,769 | B2 | 7/2008 | Jensen |
| 7,441,746 | B2 | 10/2008 | Sugiyama |
| 7,472,660 | B2 | 1/2009 | Mariman et al. |
| 7,478,603 | B2 | 1/2009 | Riewerts et al. |
| 7,490,564 | B2 | 2/2009 | Allan et al. |
| 7,502,665 | B2 | 3/2009 | Giles et al. |
| 7,626,288 | B2 | 12/2009 | Protze |
| 7,654,473 | B2 | 2/2010 | Hibberd |

(56) References Cited

U.S. PATENT DOCUMENTS

| | | |
|---|---|---|
| 7,685,951 B2 | 3/2010 | Beaujot et al. |
| 7,690,440 B2 | 4/2010 | Dean et al. |
| 7,694,638 B1 | 4/2010 | Riewerts et al. |
| 7,706,926 B2 | 4/2010 | Peterson |
| 7,742,842 B2 | 6/2010 | Giles et al. |
| 7,789,321 B2 | 9/2010 | Hitt |
| 7,826,930 B2 | 11/2010 | Giles et al. |
| 7,848,865 B2 | 12/2010 | Di Federico et al. |
| 7,917,249 B2 | 3/2011 | Jacobsen et al. |
| 7,954,731 B2 | 6/2011 | Antonucci et al. |
| 8,078,367 B2 | 12/2011 | Sauder et al. |
| 8,109,448 B2 | 2/2012 | Giles |
| 8,141,504 B2 | 3/2012 | Dean et al. |
| 8,170,825 B2 | 5/2012 | Beaujot et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,196,534 B2 | 6/2012 | Meyer et al. |
| 8,246,004 B2 | 8/2012 | Kratzer |
| 8,401,704 B2 | 3/2013 | Pollock et al. |
| 8,488,874 B2 | 7/2013 | Zaman et al. |
| 8,523,085 B2 | 9/2013 | Grimm et al. |
| 8,590,859 B2 | 11/2013 | Kurz |
| 8,634,993 B2 | 1/2014 | McClure |
| 8,635,963 B2 | 1/2014 | Friggstad |
| 8,701,707 B2 | 4/2014 | Moosmann et al. |
| 8,733,257 B2 | 5/2014 | Beaujot et al. |
| 8,733,259 B2 | 5/2014 | Beaujot |
| 8,739,830 B2 | 6/2014 | Bradbury et al. |
| 8,825,310 B2 | 9/2014 | Kowalchuk |
| 8,844,838 B2 | 9/2014 | Funseth et al. |
| 8,868,300 B2 | 10/2014 | Kocer et al. |
| 8,915,200 B2 | 12/2014 | Barsi et al. |
| 8,919,676 B2 | 12/2014 | Funseth et al. |
| 9,052,031 B2 | 6/2015 | Leidig |
| 9,061,296 B2 | 6/2015 | Peterson |
| 9,073,070 B2 | 7/2015 | Funseth et al. |
| 9,080,684 B2 | 7/2015 | Stahr |
| 9,113,591 B2 | 8/2015 | Shivak |
| 9,144,190 B2 | 9/2015 | Henry et al. |
| 9,266,124 B2 | 2/2016 | Humpal |
| 9,453,585 B2 | 9/2016 | Sato et al. |
| 9,470,332 B2 | 10/2016 | Miura |
| 9,504,212 B2 | 11/2016 | Michael et al. |
| 9,506,578 B2 | 11/2016 | Lee |
| 9,702,475 B2 | 7/2017 | Scheffel et al. |
| 9,781,916 B2 | 10/2017 | Preheim et al. |
| 9,894,829 B2 | 2/2018 | Shivak |
| 10,173,236 B2 | 1/2019 | Preheim et al. |
| 10,368,538 B2 | 8/2019 | Preheim et al. |
| 10,518,284 B2 | 12/2019 | Thurow et al. |
| 10,568,257 B2 | 2/2020 | Shivak |
| 10,799,898 B2 | 10/2020 | Posselius et al. |
| 10,821,460 B2 | 11/2020 | Batcheller et al. |
| 2002/0030119 A1 | 3/2002 | Proharam |
| 2002/0107609 A1 | 8/2002 | Benneweis |
| 2003/0028321 A1 | 2/2003 | Upadhyaya et al. |
| 2003/0070597 A1 | 4/2003 | Cresswell |
| 2004/0036048 A1 | 2/2004 | Petersen |
| 2004/0104370 A1 | 6/2004 | Suzuki |
| 2005/0000277 A1 | 1/2005 | Giles |
| 2005/0048196 A1 | 3/2005 | Yanagita et al. |
| 2005/0051749 A1 | 3/2005 | Lee |
| 2005/0076818 A1 | 4/2005 | Grimm |
| 2005/0092951 A1 | 5/2005 | Groetzinger |
| 2005/0125083 A1 | 6/2005 | Kiko |
| 2005/0173979 A1 | 8/2005 | Voss |
| 2006/0086295 A1 | 4/2006 | Jensen |
| 2006/0097210 A1 | 5/2006 | Fong et al. |
| 2006/0237562 A1 | 10/2006 | Hedegard |
| 2006/0265106 A1 | 11/2006 | Giles et al. |
| 2006/0273189 A1 | 12/2006 | Grimm et al. |
| 2007/0039880 A1 | 2/2007 | Mayerle |
| 2008/0110476 A1 | 5/2008 | Amestoy et al. |
| 2008/0114497 A1 | 5/2008 | Giles et al. |
| 2008/0114498 A1 | 5/2008 | Giles |
| 2008/0147282 A1 | 6/2008 | Kormann |
| 2008/0163807 A1 | 7/2008 | Dean et al. |
| 2008/0283633 A1 | 11/2008 | Nozaki et al. |
| 2008/0296398 A1 | 12/2008 | Hickman et al. |
| 2009/0078178 A1 | 3/2009 | Beaujot |
| 2009/0101371 A1 | 4/2009 | Melanson et al. |
| 2009/0112372 A1 | 4/2009 | Peterson |
| 2009/0114210 A1 | 5/2009 | Guice et al. |
| 2009/0134237 A1 | 5/2009 | Giles |
| 2009/0184182 A1 | 7/2009 | Beeren |
| 2009/0271136 A1 | 10/2009 | Beaujot et al. |
| 2010/0032492 A1 | 2/2010 | Grimm et al. |
| 2010/0096476 A1 | 4/2010 | Callies et al. |
| 2010/0101469 A1 | 4/2010 | Landphair et al. |
| 2010/0132600 A1 | 6/2010 | Dean et al. |
| 2010/0269921 A1 | 10/2010 | Pifer et al. |
| 2011/0054743 A1 | 3/2011 | Kocer et al. |
| 2011/0160920 A1 | 6/2011 | Orr et al. |
| 2011/0179984 A1 | 7/2011 | Beaujot et al. |
| 2011/0204272 A1 | 8/2011 | Kratzer |
| 2011/0210186 A1 | 9/2011 | Kugler et al. |
| 2012/0045013 A1 | 2/2012 | Chen et al. |
| 2012/0080624 A1 | 4/2012 | Stahr et al. |
| 2012/0168530 A1 | 7/2012 | Ellingson et al. |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |
| 2012/0216732 A1 | 8/2012 | Ballard et al. |
| 2012/0228395 A1 | 9/2012 | Needham |
| 2012/0241533 A1 | 9/2012 | Moeller et al. |
| 2012/0271467 A1 | 10/2012 | Grimm et al. |
| 2013/0032737 A1 | 2/2013 | Neilson et al. |
| 2013/0037633 A1 | 2/2013 | Walter et al. |
| 2013/0092746 A1 | 4/2013 | Scott et al. |
| 2013/0119154 A1 | 5/2013 | Sawyer |
| 2013/0192503 A1 | 8/2013 | Henry et al. |
| 2013/0269578 A1 | 10/2013 | Grimm |
| 2013/0292590 A1 | 11/2013 | Stahr |
| 2013/0306894 A1 | 11/2013 | Weis et al. |
| 2013/0320106 A1 | 12/2013 | Schmidt |
| 2013/0333601 A1 | 12/2013 | Shivak |
| 2014/0014863 A1 | 1/2014 | Najmolhoda et al. |
| 2014/0026995 A1 | 1/2014 | Mayr et al. |
| 2014/0048002 A1 | 2/2014 | Grimm et al. |
| 2014/0084196 A1 | 3/2014 | Heyer et al. |
| 2014/0091243 A1 | 4/2014 | Leidig |
| 2014/0216315 A1 | 8/2014 | Beaujot et al. |
| 2014/0263705 A1 | 9/2014 | Michael et al. |
| 2014/0263709 A1 | 9/2014 | Kocer et al. |
| 2014/0277780 A1 | 9/2014 | Jensen et al. |
| 2014/0299673 A1 | 10/2014 | Grimm et al. |
| 2014/0312141 A1 | 10/2014 | Ravishankar |
| 2014/0333398 A1 | 11/2014 | Nila et al. |
| 2014/0361094 A1 | 12/2014 | Michael |
| 2015/0257331 A1 | 9/2015 | Shivak |
| 2015/0367352 A1 | 12/2015 | Burchardt |
| 2015/0367357 A1 | 12/2015 | Humpal et al. |
| 2015/0367358 A1 | 12/2015 | Funseth et al. |
| 2015/0375247 A1 | 12/2015 | Funseth et al. |
| 2016/0015020 A1 | 1/2016 | Needham et al. |
| 2016/0017792 A1 | 1/2016 | Fletcher et al. |
| 2016/0044862 A1 | 2/2016 | Kocer et al. |
| 2016/0084382 A1 | 3/2016 | Pisasale |
| 2016/0136671 A1 | 5/2016 | Kocer |
| 2016/0175869 A1 | 6/2016 | Sullivan et al. |
| 2016/0178422 A1 | 6/2016 | Humpal et al. |
| 2016/0227755 A1 | 8/2016 | Preheim et al. |
| 2016/0251008 A1 | 9/2016 | Jeon et al. |
| 2017/0018345 A1 | 1/2017 | Raff et al. |
| 2017/0079200 A1 | 3/2017 | Posselius et al. |
| 2017/0284285 A1 | 10/2017 | Lenk et al. |
| 2017/0314580 A1 | 11/2017 | Steensma et al. |
| 2017/0348718 A1 | 12/2017 | Preheim et al. |
| 2018/0042214 A1 | 2/2018 | Preheim et al. |
| 2018/0111148 A1 | 4/2018 | Batcheller et al. |
| 2018/0288934 A1 | 10/2018 | Shivak |
| 2019/0029170 A1 | 1/2019 | Wilger |

(56) References Cited

U.S. PATENT DOCUMENTS

| | | | |
|---|---|---|---|
| 2019/0373880 A1 | 12/2019 | Kocer et al. | |
| 2020/0113171 A1 | 4/2020 | Davis et al. | |
| 2020/0253111 A1 | 8/2020 | Schlipf et al. | |

FOREIGN PATENT DOCUMENTS

| | | |
|---|---|---|
| AU | 2005247004 | 12/2006 |
| AU | 2006202376 B2 | 12/2006 |
| AU | 2009203181 A1 | 2/2010 |
| AU | 2012201357 A1 | 9/2012 |
| AU | 2013203361 A1 | 10/2013 |
| AU | 2013204455 A1 | 3/2014 |
| AU | 2013248190 | 5/2014 |
| AU | 2013277513 B2 | 3/2017 |
| CA | 2229852 A1 | 8/1998 |
| CA | 2517031 A1 | 9/2004 |
| CA | 2528708 A1 | 11/2006 |
| CA | 2549300 A1 | 12/2006 |
| CA | 2674527 A1 | 2/2010 |
| CA | 2770013 A1 | 9/2012 |
| CA | 2811726 A1 | 10/2013 |
| CA | 2813949 A1 | 2/2014 |
| CA | 2830306 | 4/2014 |
| CN | 102435019 A | 5/2012 |
| CN | 202255911 U | 5/2012 |
| CN | 102266829 B | 12/2012 |
| CN | 203264929 U | 11/2013 |
| DE | 102011053182 | 3/2013 |
| EP | 0576121 B1 | 3/1996 |
| EP | 969712 | 1/2000 |
| EP | 0963255 B1 | 10/2002 |
| EP | 0847307 B2 | 1/2003 |
| EP | 1426112 B1 | 6/2011 |
| FR | 2964047 A1 | 3/2012 |
| GB | 990346 A | 4/1965 |
| GB | 2322573 A | 9/1998 |
| JP | 2759711 B2 | 5/1998 |
| JP | 2000139245 A | 5/2000 |
| JP | 2005161221 A | 6/2005 |
| WO | WO-9712688 A1 | 4/1997 |
| WO | WO-98037751 | 9/1998 |
| WO | WO-9842178 A1 | 10/1998 |
| WO | WO-9916007 A1 | 4/1999 |
| WO | WO-1999016007 A1 | 4/1999 |
| WO | WO-2004023865 | 3/2004 |
| WO | WO-2004081499 | 9/2004 |
| WO | WO-2005048704 A2 | 6/2005 |
| WO | WO-2008112930 A1 | 9/2008 |
| WO | WO-2010105221 A1 | 9/2010 |
| WO | WO-2012022903 A1 | 2/2012 |
| WO | WO-2013191990 A2 | 12/2013 |
| WO | WO-2013191990 A3 | 12/2013 |
| WO | WO-2014201008 A1 | 12/2014 |
| WO | WO 2014210043 A1 | 12/2014 |
| WO | WO-2015058091 A1 | 4/2015 |
| WO | WO-2016145081 A2 | 9/2016 |
| WO | WO-2017124175 A1 | 7/2017 |
| WO | WO-2017192625 A1 | 11/2017 |
| WO | WO-2017223252 A1 | 12/2017 |
| WO | WO-2018129323 A1 | 7/2018 |
| WO | WO-2018129376 A2 | 7/2018 |
| WO | WO-2018129376 A3 | 7/2018 |

OTHER PUBLICATIONS

U.S. Appl. No. 15/821,113 U.S. Pat. No. 10,568,257, filed Nov. 22, 2017, Implement for Adjustably Metering an Agricultural Field Input According to Different Frame Sections.
U.S. Appl. No. 14/727,535 U.S. Pat. No. 9,894,829, filed Jun. 1, 2015, Implement for Adjustably Metering an Agricultural Field Input According to Different Frame Sections.
U.S. Appl. No. 14/300,761, filed Jun. 10, 2014, Localized Product Injection System for an Agricultural Sprayer.
U.S. Appl. No. 16/476,016, filed Jul. 3, 2019, Localized Product Injection System and Methods for Same.
"U.S. Appl. No. 13/776,285, Amendment and Response under 37 C.F.R. Sec. 1.114 filed Apr. 27, 2015", 13 pgs.
"U.S. Appl. No. 13/776,285, Non Final Office Action dated Jul. 30, 2014", 15 pgs.
"U.S. Appl. No. 13/776,285, Notice of Allowance dated Jan. 27, 2015", 5 pgs.
"U.S. Appl. No. 13/776,285, Notice of Allowance dated May 4, 2015", 6 pgs.
"U.S. Appl. No. 13/776,285, Response filed Dec. 30, 2014 to Non Final Office Action dated Jul. 30, 2014", 25 pgs.
"U.S. Appl. No. 13/832,678, Advisory Action dated Jun. 3, 2016", 3 pgs.
"U.S. Appl. No. 13/832,678, Final Office Action dated Mar. 17, 2016", 12 pgs.
"U.S. Appl. No. 13/832,678, Non Final Office Action dated Oct. 1, 2015", 15 pgs.
"U.S. Appl. No. 13/832,678, Notice of Allowance dated Jul. 20, 2016", 13 pgs.
"U.S. Appl. No. 13/832,678, Response filed May 12, 2016 to Final Office Action dated Mar. 17, 2016", 10 pgs.
"U.S. Appl. No. 13/832,678, Response filed Jul. 27, 2015 to Restriction Requirement dated Jun. 9, 2015", 7 pgs.
"U.S. Appl. No. 13/832,678, Response filed Dec. 31, 2015 to Non Final Office Action dated Oct. 1, 2015", 10 pgs.
"U.S. Appl. No. 13/832,678, Restriction Requirement dated Jun. 9, 2015", 7 pgs.
"U.S. Appl. No. 14/300,761, Advisory Action dated Dec. 12, 2017", 3 pgs.
"U.S. Appl. No. 14/300,761, Examiner Interview Summary dated Nov. 22, 2017", 3 pgs.
"U.S. Appl. No. 14/300,761, Final Office Action dated Aug. 31, 2017", 11 pgs.
"U.S. Appl. No. 14/300,761, Final Office Action dated Nov. 27, 2018", 16 pgs.
"U.S. Appl. No. 14/300,761, Non Final Office Action dated Feb. 8, 2017", 13 pgs.
"U.S. Appl. No. 14/300,761, Non Final Office Action dated May 24, 2018", 16 pgs.
"U.S. Appl. No. 14/300,761, Response filed Jun. 7, 2017 to Non Final Office Action dated Feb. 8, 2017", 16 pgs.
"U.S. Appl. No. 14/300,761, Response filed Oct. 24, 2018 to Non Final Office Action dated May 24, 2018", 22 pgs.
"U.S. Appl. No. 14/300,761, Response filed Dec. 20, 2016 to Restriction Requirement dated Oct. 20, 2016", 15 pgs.
"U.S. Appl. No. 14/300,761, Resposne filed Nov. 16, 2017 to Final Office Action dated Aug. 31, 2017", 16 pgs.
"U.S. Appl. No. 14/300,761, Restriction Requirement dated Oct. 20, 2016", (9 pgs).
"U.S. Appl. No. 14/727,535, Corrected Notice of Allowance dated Jan. 12, 2018", 2 pgs.
"U.S. Appl. No. 14/727,535, Final Office Action dated Jun. 21, 2017", 6 pgs.
"U.S. Appl. No. 14/727,535, Non Final Office Action dated Feb. 16, 2017", 17 pgs.
"U.S. Appl. No. 14/727,535, Notice of Allowance dated Aug. 24, 2017", 5 pgs.
"U.S. Appl. No. 14/727,535, Preliminary Amendment filed Jun. 2, 2015", 9 pgs.
"U.S. Appl. No. 14/727,535, Response filed Jan. 17, 2017 to Restriction Requirement dated Nov. 17, 2016", 12 pgs.
"U.S. Appl. No. 14/727,535, Response filed May 6, 2017 to Non Final Office Action dated Feb. 16, 2017", 18 pgs.
"U.S. Appl. No. 14/727,535, Response filed Aug. 14, 2017 to Final Office Action dated Jun. 21, 2017", 9 pgs.
"U.S. Appl. No. 14/727,535, Restriction Requirement dated Nov. 17, 2016", 6 pgs.
"U.S. Appl. No. 14/899,946, Final Office Action dated Dec. 28, 2018", 41 pgs.
"U.S. Appl. No. 14/899,946, Non Final Office Action dated Mar. 26, 2018", 37 pgs.

(56) References Cited

OTHER PUBLICATIONS

"U.S. Appl. No. 14/899,946, Response filed Aug. 27, 2018 to Non Final Office Action dated Mar. 26, 2018", 27 pgs.
"U.S. Appl. No. 15/029,935, Final Office Action dated Jul. 11, 2017", 6 pgs.
"U.S. Appl. No. 15/029,935, Non Final Office Action dated Mar. 30, 2017", 21 pgs.
"U.S. Appl. No. 15/029,935, Notice of Allowance dated Aug. 29, 2017", 5 pgs.
"U.S. Appl. No. 15/029,935, Preliminary Amendment filed Apr. 15, 2016", 3 pgs.
"U.S. Appl. No. 15/029,935, Reponse filed Aug. 16, 2017 to Final Office Action dated Jul. 11, 2017", 11 pgs.
"U.S. Appl. No. 15/029,935, Response filed Jun. 15, 2017 to Non Final Office Action dated Mar. 30, 2017", 12 pgs.
"U.S. Appl. No. 15/585,034, Non Final Office Action dated Nov. 2, 2018", 25 pgs.
"U.S. Appl. No. 15/629,696, Corrected Notice of Allowability dated Aug. 29, 2018", 4 pgs.
"U.S. Appl. No. 15/629,696, Corrected Notice of Allowability dated Dec. 7, 2018", 2 pgs.
"U.S. Appl. No. 15/629,696, Ex Parte Quayle Action mailed May 3, 2018", 12 pgs.
"U.S. Appl. No. 15/629,696, Response filed Jul. 3, 2018 to Ex Parte Quayle Action mailed May 3, 2018", 13 pgs.
"U.S. Appl. No. 15/629,696, Response to Examiner's Reasons for Allowance filed Nov. 13, 2018", 2 pgs.
"U.S. Appl. No. 15/703,818, Corrected Notice of Allowability dated Jul. 8, 2019", 2 pgs.
"U.S. Appl. No. 15/703,818, Non Final Office Action dated Oct. 11, 2018", 6 pgs.
"U.S. Appl. No. 15/703,818, Notice of Allowance dated Mar. 20, 2019", 5 pgs.
"U.S. Appl. No. 15/703,818, Preliminary Amendment filed Nov. 3, 2017", 6 pgs.
"U.S. Appl. No. 15/703,8181, Response filed Jan. 11, 2019 to Non Final Office Action dated Oct. 11, 2018", 9 pgs.
"U.S. Appl. No. 15/821,113, Ex Parte Quayle Action mailed Aug. 9, 2019", 4 pgs.
"U.S. Appl. No. 15/821,113, Notice of Allowance dated Sep. 27, 2019", 5 pgs.
"U.S. Appl. No. 15/821,113, Notice of Allowance dated Oct. 22, 2019", 5 pgs.
"U.S. Appl. No. 15/821,113, Notice of Non-Compliant Amendment dated Jun. 11, 2019", 4 pgs.
"U.S. Appl. No. 15/821,113, Preliminary Amendment filed Jun. 28, 2018", 7 pgs.
"U.S. Appl. No. 15/821,113, Response filed Apr. 29, 2019 to Restriction Requirement dated Nov. 30, 2018", 10 pgs.
"U.S. Appl. No. 15/821,113, Response filed Jul. 11, 2019 to Notice of Non-Compliant Amendment dated Jun. 11, 2019", 12 pgs.
"U.S. Appl. No. 15/821,113, Response filed Sep. 9, 2019 to Ex Parte Quayle Action mailed Aug. 9, 2019", 3 pgs.
"U.S. Appl. No. 15/821,113, Restriction Requirement dated Nov. 30, 2018", 6 pgs.
"U.S. Appl. No. 16/476,016, Preliminary Amendment filed Jul. 3, 2019", 12 pgs.
"Application Serial No. PCT/US2014/061150, International Preliminary Report on Patentability dated Oct. 16, 2015", 10 pgs.
"U.S. Appl. No. 15/629,696, Notice of Allowance dated Aug. 13, 2018", 5 pgs.
"Australian Application Serial No. 2013277513, First Examiners Report dated Jul. 26, 2016", 3 pgs.
"Australian Application Serial No. 2013277513, Notice of Acceptance dated Nov. 8, 2016", 2 pgs.
"Australian Application Serial No. 2013277513, Response filed Oct. 28, 2016 to First Examiners Report dated Jul. 26, 2016", 20 pgs.
"Australian Application Serial No. 2014278310, First Examiners Report dated Jul. 28, 2017", 5 pgs.
"Australian Application Serial No. 2017285727, First Examination Report dated May 21, 2019", 2 pgs.
"Brazil Application Serial No. 1120160085175, Office Action dated Nov. 6, 2018".
"Canadian Application Serial No. 2,877,195, Office Action dated Jun. 18, 2019", 3 pgs.
"Canadian Application Serial No. 2,926,448, Examiner's Rule 30(2) Requisition dated Oct. 3, 2018", 3 pgs.
"Canadian Application Serial No. 2,926,448, Office Action dated Jan. 5, 2018", 5 pgs.
"Canadian Application Serial No. 2,926,448, Response filed Mar. 19, 2019 to Examiner's Rule 30(2) Requisition dated Oct. 3, 2018", 7 pgs.
"Canadian Application Serial No. 2,926,448, Response filed Jun. 26, 2018 to Office Action dated Jan. 5, 2018", 19 pgs.
"European Application Serial No. 13807150.1, Communication Pursuant to Article 94(3) EPC dated Nov. 8, 2017", 5 pgs.
"European Application Serial No. 13807150.1, Extended European Search Report dated Jan. 8, 2016", 8 pgs.
"European Application Serial No. 13807150.1, Office Action dated Jan. 26, 2016", 1 pg.
"European Application Serial No. 13807150.1, Office Action dated Feb. 3, 2015", 3 pgs.
"European Application Serial No. 13807150.1, Response filed Aug. 3, 2015 to Office Action dated Feb. 3, 2015", 10 pgs.
"European Application Serial No. 13807150.1, Response filed Aug. 5, 2016 to Office Action dated Jan. 26, 2016", 14 pgs.
"German Application Serial No. 11 2017 003 084.6, Office Action dated Feb. 5, 2019", W/O English Translation, 2 pgs.
"International Application Serial No. PCT/US2013/045445, International Preliminary Report on Patentability dated Dec. 31, 2014", 7 pgs.
"International Application Serial No. PCT/US2013/045445, International Search Report dated Nov. 27, 2013", 3 pgs.
"International Application Serial No. PCT/US2013/045445, Written Opinion dated Nov. 27, 2013", 9 pgs.
"International Application Serial No. PCT/US2014/041717, International Preliminary Report on Patentability dated May 6, 2015", 11 pgs.
"International Application Serial No. PCT/US2014/041717, International Search Report dated Oct. 15, 2014", 2 pgs.
"International Application Serial No. PCT/US2014/041717, Response and Amendment filed Apr. 5, 2015 to Written Opinion dated Oct. 15, 2014", 15 pgs.
"International Application Serial No. PCT/US2014/041717, Written Opinion dated Oct. 15, 2014", 7 pgs.
"International Application Serial No. PCT/US2014/043926, International Preliminary Report on Patentability dated Jan. 7, 2016", 11 pgs.
"International Application Serial No. PCT/US2014/043926, International Search Report dated Nov. 3, 2014", 2 pgs.
"International Application Serial No. PCT/US2014/043926, Written Opinion dated Nov. 3, 2014", 9 pgs.
"International Application Serial No. PCT/US2014/061150, International Search Report dated Feb. 4, 2015", 2 pgs.
"International Application Serial No. PCT/US2014/061150, Written Opinion dated Feb. 4, 2015", 7 pgs.
"International Application Serial No. PCT/US2017/030694, International Preliminary Report on Patentability dated May 29, 2018", 23 pgs.
"International Application Serial No. PCT/US2017/030694, International Search Report dated Aug. 1, 2017", 3 pgs.
"International Application Serial No. PCT/US2017/030694, Response filed Mar. 2, 2018 to Written Opinion dated Aug. 1, 2017", 4 pgs.
"International Application Serial No. PCT/US2017/030694, Written Opinion dated Aug. 1, 2017", 8 pgs.
"International Application Serial No. PCT/US2017/038622, International Preliminary Report on Patentability dated Jan. 3, 2019", 7 pgs.
"International Application Serial No. PCT/US2017/038622, International Search Report dated Sep. 28, 2017", 2 pgs.
"International Application Serial No. PCT/US2017/038622, Written Opinion dated Sep. 28, 2017", 5 pgs.

(56) References Cited

OTHER PUBLICATIONS

"International Application Serial No. PCT/US2018/012590, International Preliminary Report on Patentability dated Jul. 18, 2019", 15 pgs.
"International Application Serial No. PCT/US2018/012590, International Search Report dated Apr. 13, 2018", 4 pgs.
"International Application Serial No. PCT/US2018/012590, Invitation to Pay Additional Fees and Partial Search Report dated Feb. 21, 2018", 2 pgs.
"International Application Serial No. PCT/US2018/012590, Written Opinion dated Apr. 13, 2018", 13 pgs.
"International Application Serial No. PCT/US2018/012661, International Search Report dated Jun. 21, 2018", 4 pgs.
"International Application Serial No. PCT/US2018/012661, Invitation to Pay Additional Fees and Partial Search Report dated Mar. 15, 2018", 2 pgs.
"International Application Serial No. PCT/US2018/012661, Written Opinion dated Jun. 21, 2018", 9 pgs.
Bevly, David M, et al., "Carrier-Phase Differential GPS for Control of a Tractor Towed Implement", Proceedings of the 13th International Technical Meeting of the Satellite Division of the Institute of Navigation (ION GPS 2000), (2000), 2263-2268.
Dietz, John, "A five-part program for efficient farming", Farming, (Apr. 2000), 1-4.
Elmore, Clyde L., "Soil Solarization a Nonpesticidal Method for Controlling Diseases, Nematodes, and Weeds", University of California Division of Agriculture and Natural Resources Publication 21377, (1-17), 1997.
Van Zuydam, R. P, "A driver's steering aid for an agricultural implement, based on an electronic map and Real Time Kinematic DGPS", Computers and Electronics in Agriculture, 24(3), (Dec. 1999), 153-163.
Van Zuydam, R. P, "Centimeter-Precision Guidance of Agricultural Implements in the Open Field by Means of Real Time Kinematic Dgps", Proceedings of the Fourth International Conference on Precision Agriculture, (1999), 1023-1034.
"U.S. Appl. No. 14/300,761, Non-Final Office Action dated Apr. 15, 2020", 17 pgs.
"U.S. Appl. No. 14/300,761, Response filed Nov. 29, 2019 to Final Office Action dated Nov. 27, 2018", 21 pgs.
"U.S. Appl. No. 15/821,113, Corrected Notice of Allowability dated Jan. 2, 2020", 2 pgs.
"U.S. Appl. No. 15/821,113, Corrected Notice of Allowability dated Jan. 28, 2020", 2 pgs.
"Australian Application Serial No. 2018205225, First Examination Report dated Apr. 15, 2020", 8 pgs.
"Canadian Application Serial No. 2,877,195, Response filed Dec. 18, 2019 to Office Action dated Jun. 18, 2019", 10 pgs.
"European Application Serial No. 18736496.3, Response to Communication Pursuant to Rules 161(2) and 162 EPC filed Feb. 28, 2020", 14 pgs.
"U.S. Appl. No. 14/300,761, Response filed Oct. 15, 2020 to Non Final Office Action dated Apr. 15, 2020", 17 pgs.
"Canadian Application Serial No. 3,049,391, Office Action dated Sep. 4, 2020", 4 pgs.
"European Application Serial No. 18736496.3, Extended European Search Report dated Sep. 15, 2020", 9 pgs.
"U.S. Appl. No. 14/300,761, Final Office Action dated Dec. 18, 2020", 14 pgs.
"Australian Application Serial No. 2018205225, Response filed Jan. 19, 2021 to First Examination Report dated Apr. 15, 2020", 14 pgs.
"Canadian Application Serial No. 2,877,195, Office Action dated Dec. 9, 2020", 3 pgs.
"Canadian Application Serial No. 2,877,195, Voluntary Amendment filed Nov. 16, 2020", 13 pgs.
"U.S. Appl. No. 17/161,453, Preliminary Amendment dated Jan. 28, 2021", 8 pgs.
"Australian Application Serial No. 2018205225, Subsequent Examiners Report dated Feb. 11, 2021", 6 pgs.
"U.S. Appl. No. 14/300,761, Notice of Allowance dated May 7, 2021", 16 pgs.
"U.S. Appl. No. 14/300,761, Response filed Apr. 19, 2021 to Final Office Action dated Dec. 18, 2020", 19 pgs
"U.S. Appl. No. 16/476,016, Restriction Requirement dated Apr. 30, 2021", 8 pgs.
"Australian Application Serial No. 2018205225, Response filed Apr. 13, 2021 to Subsequent Examiners Report dated Feb. 11, 2021", 24 pgs.
"Canadian Application Serial No, 2,877,195, Response filed Apr. 8, 2021 to Office Action dated Dec. 9, 2020", 16 pgs.
"Canadian Application Serial No. 3,049,391, Response filed Mar. 3, 2021 to Office Action dated Sep. 4, 2020", 11 pgs.
"European Application Serial No. 18736496.3, Response filed Apr. 12, 2021 to Extended European Search Report dated Sep. 15, 2020", 31 pgs.

IMPLEMENT FOR ADJUSTABLY METERING AN AGRICULTURAL FIELD INPUT ACCORDING TO DIFFERENT FRAME SECTIONS

RELATED APPLICATIONS

This patent application is a continuation of U.S. patent application Ser. No. 15/821,113, filed on Nov. 22, 2017; which is a continuation of U.S. patent application Ser. No. 14/727,535, filed on Jun. 1, 2015; which is a continuation of U.S. patent application Ser. No. 13/776,285, filed on Feb. 25, 2013; which claims the benefit of priority, under 35 U.S.C. § 119(e), to U.S. Provisional Patent Application Ser. No. 61/661,181, filed on Jun. 18, 2012; all of which are incorporated herein by reference in their entirety.

FIELD OF THE INVENTION

The present invention relates to metering devices for an agricultural implement for applying a field input, for example pneumatically delivered granular product including seed or fertilizer or sprayed liquid product including fertilizer and the like, to an agricultural field in which the rate of application of the dispensers of one section of the implement can be collectively varied in relation to the rate of application of the dispensers of a different section of the implement frame.

BACKGROUND

When supplying an input product to an agricultural field, for example seed or fertilizer with air seeding implements, or various liquid products with an agricultural sprayer, the input product is typically applied evenly across a width of the frame of the implement. The usual distribution pattern of an implement across an agricultural field is to pass along the field in longitudinal rows with the rows being connected to one another by 180° curved sections joining the ends of adjacent ones of the rows. At the outside of the curve however the implement passes much more ground than the inner portion of the curved section such that when the product is evenly dispersed across the width of the frame, the product is applied to the field at a rate which is too dense at the inside of the curved section and too sparse at the outside of the curved section.

SUMMARY OF THE INVENTION

According to one aspect of the invention there is provided an implement for applying an input product to an agricultural field, the implement comprising:

a frame arranged to be supported for movement across the field in a forward working direction in which the frame includes a plurality of designated frame sections;

a plurality of product dispensers supported on the frame in association with each designated frame section;

a product supply arranged to store the input product therein so as to be supported for movement across the field together with the frame;

a plurality of conveying lines communicating between the product supply and respective ones of the product dispensers;

a plurality of metering devices in which each metering device is associated with one of the designated frame sections and communicates with at least one main line in communication with the respective conveying lines of the product dispensers associated therewith;

the metering devices being arranged to meter the input product therethrough from the product supply to the respective conveying lines at an adjustable rate relative to one another.

By providing a separate metering device for each of a plurality of designated frame sections, the dispensing devices of one frame section can be operated at a different rate from the dispensing devices from a different frame section to compensating for different ground speeds at the inner end outer portions of a curved section.

Also when passing over an end row of a designated crop area which is less than the full width of the implement frame, the metering device supplying the dispensing devices of corresponding frame sections aligned outside of the crop boundary can be shut off to limit waste and further increase efficiency of input product application.

The variable metering can be accomplished by various means. In a seeding implement, metering can be accomplished by providing main pneumatic conveying lines which communicate with the seed tanks by their own respective metering devices or by providing separate tanks in which each tank includes its own respective metering device for metering product into pneumatic conveying lines associated with only one frame section of the overall frame. In each instance the metering devices are operable in response to various speed inputs which are measured or calculated using various means.

Alternatively in the instance of a sprayer, metering of the fluid to a centre frame section, a left frame section, and a right frame section can be controlled independently by using separate pumps for the left and right sections relative to the centre section, or by using pressure reducing or throttling type valves to supply one section relative to other sections which allow one section of individual spray nozzles to be adjusted independently of the spray nozzles of another section.

In yet further arrangements of agricultural sprayers, a common rate of carrier fluid can be sprayed from all nozzles; however, metering devices are used for metering the chemical concentration of various input products into the main conveying line supplying one section of the frame relative to the main conveying line supplying a different section of the frame.

According to a second aspect of the present invention there is provided a sprayer implement for applying an input product to an agricultural field, the implement comprising:

a frame arranged to be supported for movement across the field in a forward working direction in which the frame includes a plurality of designated frame sections;

a plurality of product dispensers supported on the frame in association with each designated frame section;

a carrier fluid supply arranged to store a carrier fluid therein so as to be supported for movement across the field together with the frame;

a plurality of main lines in communication with the carrier fluid supply to receive carrier fluid therefrom in which each main line is only associated with one of the designated frame sections;

a plurality of conveying lines, each communicating a respective one of the product dispensers to one of the main lines associated with the respective designated frame section to dispense carrier fluid from the main lines therethrough;

a primary product supply arranged to store a primary input product therein so as to be supported for movement across the field together with the frame;

a plurality of metering devices in which each metering device is associated with one of the designated frame sections and communicates with at least one main line associated with the designated frame section;

the metering devices being arranged to meter the primary input product therethrough at an adjustable rate from the primary product supply into carrier fluid in the respective conveying lines whereby a metered amount of the primary input product is dispensed from the product dispensers in each designated frame section independently of the other frame sections.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
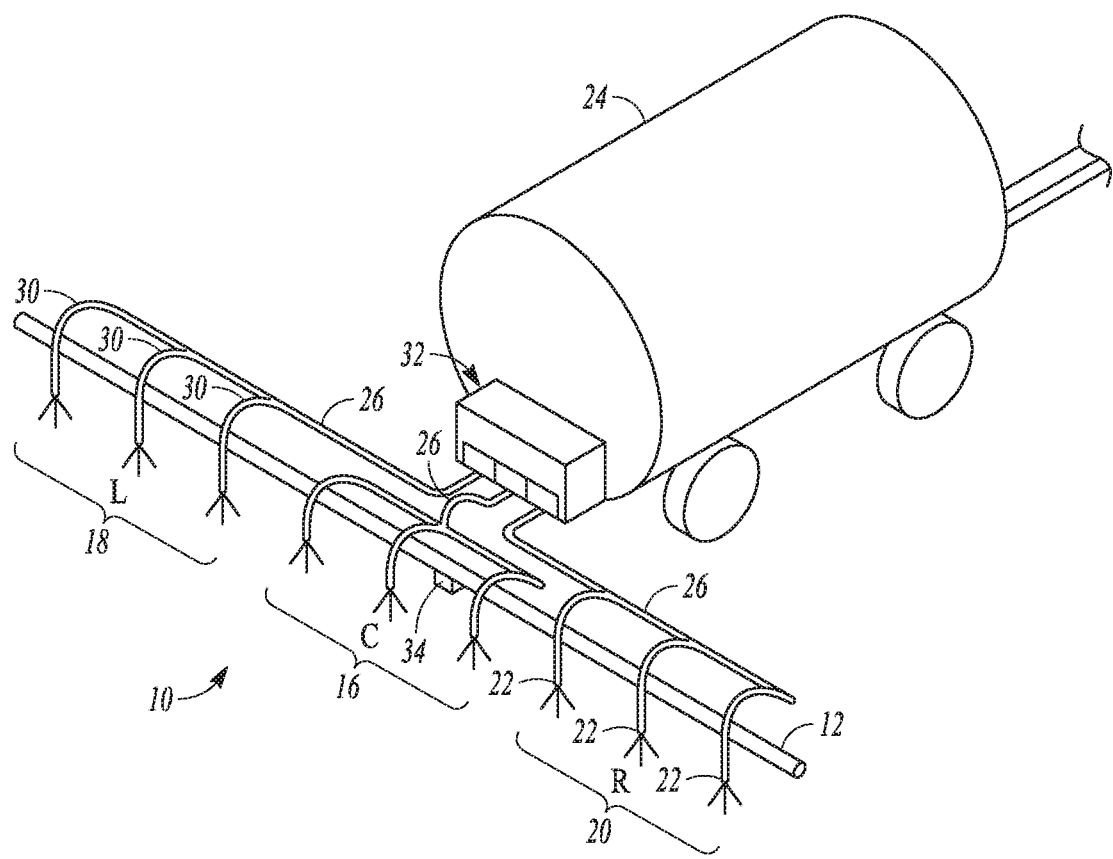
FIG. 1 is a schematic representation of one example of a sprayer implement to which the metering devices of the present invention can be applied.

Referring to the accompanying figures there is illustrated an agricultural implement for applying an input product, for example seed, granular fertilizer, liquid fertilizer and the like to an agricultural field. Although various embodiments are described and illustrated herein, the common features of the various embodiments will first be described.

In each instance, the agricultural implement 10 generally includes an implement frame 12 which is supported for movement across the ground in a forward working direction either by being supported on driven wheels or being towed by a tractor for example. The implement frame typically stands in a lateral direction perpendicular to the forward working direction and is separated into a plurality of designated frame sections 14. The frame sections may include one or more centre sections 16, one or more left wing sections 18 and one or more right wing sections 20.

In some instances, the center sections may be grouped with the winged sections such that the designated frame sections overall only comprise a left section and a right section. In each instance each frame sections extends laterally across a respective portion of the width of the frame so as not to overlap adjacent sections in the lateral direction and such that each designated frame section is positioned in series with the other frame sections in the lateral direction across the width.

A plurality of product dispensers 22 are supported on each frame section 14 such that the dispensers within each section are laterally spaced apart from one another and from the dispensers of adjacent sections. Each dispenser 22 is arranged to dispense respective product therethrough in a respective longitudinal row in the forward working direction. All of the dispensers of one designated frame section comprise a respective group of dispensers in which all of the dispensers of one group corresponding to one frame section are arranged to be commonly metered in rate relative to the rate of all dispensers of other groups in other frame sections.

The implement further includes an input product supply 24 typically in the form of a tank supporting the input product therein such that it is supported for movement across the field together with the implement frame 12 in the forward working direction. The tank may be supported on its own respective frame towed together with implement frame 12 or may be supported directly on the implement frame.

The input product is typically delivered from the product supply by a plurality of main lines 26 in communication with the supply which convey the product from the supply towards the designated frame sections. One or more main lines may be associated with each frame section for directing the product from the supply to one or more manifolds associated with the respective frame sections. The manifolds in turn redirect the supplied input product into a plurality of individual conveying lines 30 in which each conveying line is associated with only one respective product dispenser.

A plurality of metering devices 32 are supported with the input product supply 24 to meter the product from the supply into the main lines and the corresponding individual conveying lines to the product dispensers. One metering device 32 is associated with each designated frame section of the implement frame such that all of the product dispensers 22 of one respective frame section are commonly metered together by the respective metering device typically in communication between the product supply 24 and the main lines 26 upstream of the manifolds 28 and the individual conveying lines 30.

Figure 11:
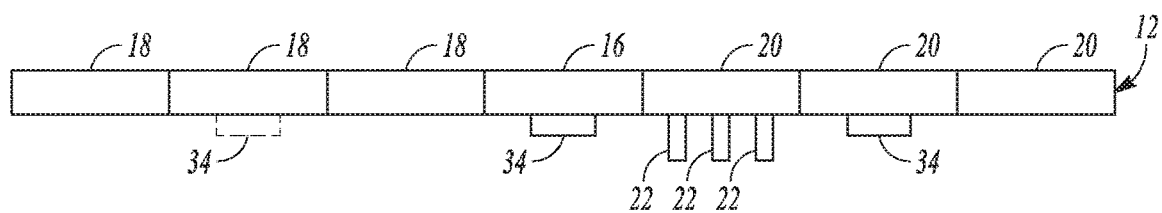
FIG. 11 is a schematic representation of an implement according to the present invention which is separated into a plurality of designated frame sections and which calculates a speed input for each designated frame section based on respective speed sensors.

Each metering device 32 is operable at a rate independently of the other metering devices in response to a respective speed input corresponding to the ground speed of the respective frame section with which the metering device is associated. The speed input is determined for each metering device either by providing a speed sensor 34 on each frame section for directly measuring the speed input for each metering device, or alternatively the speed input for each metering device can be calculated based on various measured inputs. For example, as shown in FIG. 11, one speed sensor may be centrally located to measure the average forward speed of the implement frame with at least one other speed sensor being provided at a laterally spaced location associated with one side section to determine if one side section is moving faster or slower than the central or average ground speed of the implement frame. This comparison permits corresponding calculation of the ground speed of the other side of the frame.

Speed calculation may be performed mechanically using a ground engaging wheel with a wheel rotation counter, by radar, or by GPS for example with the measured data being input into a computer controller which then calculates the appropriate speed input for each metering device representing an average forward ground speed of the respective designated frame section with which the metering device is associated and a corresponding metering rate.

Turning now to the embodiments of FIGS. 1 through 6, the implement frame in this instance comprises an agricultural sprayer such that the frame comprises a boom supported on a rolling vehicle chassis which also supports the input product supply 24 thereon in the form of a liquid tank.

The overall metering system in this instance typically includes one pump 36 supplying an overall flow rate of product to the main lines as measured by a downstream flow rate sensor 38. The conveying lines in this instance comprise pressure fluid conveying lines while the product dispensers comprise nozzles which are spaced apart on the boom from which the product can be sprayed downwardly onto the ground. The frame sections typically comprise one center section 16 or one or more left wing sections with a corresponding number of right wing sections. The centre section is operated at an average rate which is determined by the average forward ground speed and which is the basis for the operation of a primary pump 36 when there is only one primary pump.

Figure 2:
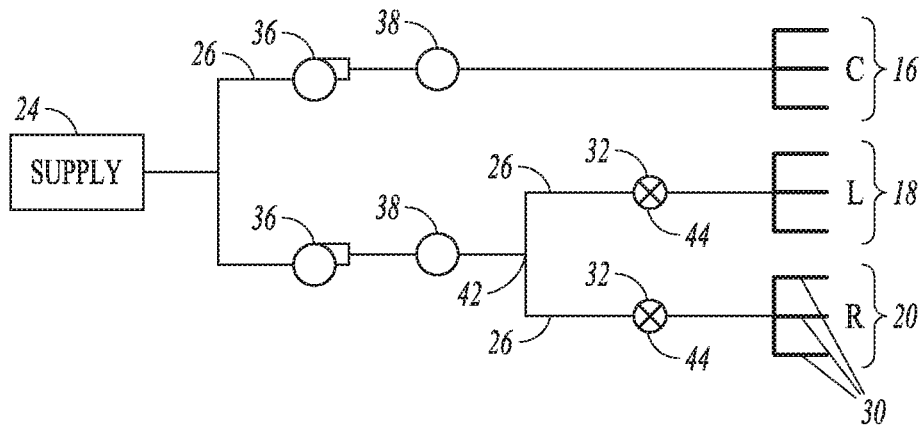
FIGS. 2 through 6 each schematically illustrate one respective embodiment of the metering system of the present invention applied to an agricultural sprayer.

Turning now more particularly to the embodiment of FIG. 2, in this instance two pumps are provided and each is arranged to be operated at a designated flow rate by adjusting the operating rate based on deviation of the flow rate measured by downstream flow rate sensors 38 from respective set point flow rates. The set point rates are the desired operating rates based on the calculated or measured speed input.

In the embodiment of FIG. 2 the main line to the center section is isolated from the other lines and is supplied with its own respective one of the pumps 40 with a flow rate sensor. The center pump 40 functions as the metering system for the main line of the center frame section. A branched line upstream from the center pump 40 communicates with the primary pump 36 supplying all other sections such that the combined flow rate of the centre pump and the primary pump 36 correspond to the overall desired flow rate for all sections during normal operation.

A primary manifold 42 downstream from the primary pump 36 splits the flow into a plurality of main lines associated with the plurality of side sections respectively. The metering device 32 of each side section in this instance comprises a suitable valve 44 connected in series with the mainline. The valve may comprise a throttling valve or a pressure reducing valve for example which is operable in response to a measured downstream flow rate sensor so that the flow in one side section can be adjusted relative to another side section while maintaining the overall flow rate consistent and while maintaining the flow rate in center section isolated from the adjusted flow rate of the side sections. Each valve 44 could also comprise a three way valve which allows some flow to be diverted from one side section to another side section.

Figure 3:
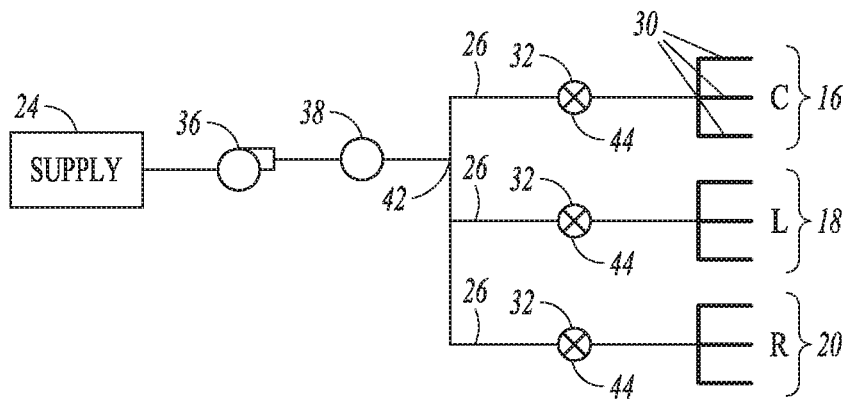

In the embodiment of FIG. 3 the primary pump 36 supplies the overall flow rate upstream from any of the metering devices to supply a primary manifold 42 which separates the line from the primary pump 36 into the individual main lines 26 which in turn supply the respective designed sections of the frame. Each main line in this instance is provided with its own pressure reducing valve 44 which is typically operated by pulse width modulation to maintain flow rate therethrough at a set point rate. The valve is operated to return the rate through the line to the set point rate whenever a downstream flow rate sensor detects that the actual measured rate deviates from the set point rate.

Figure 5:
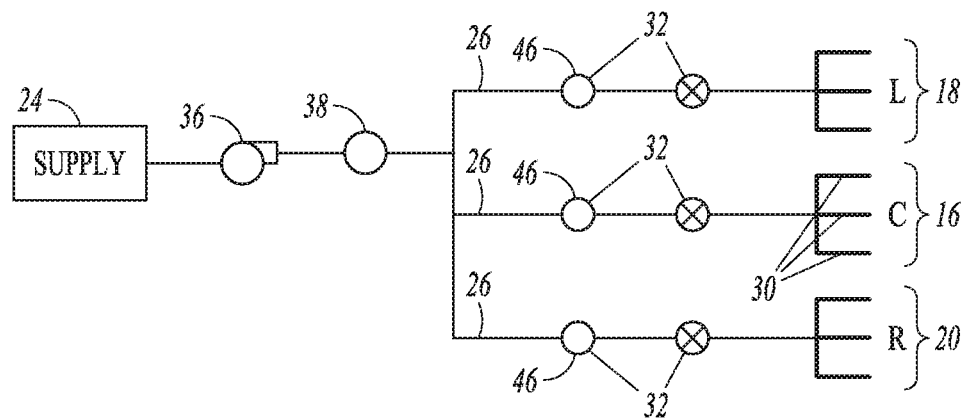

The embodiment of FIG. 5 is similar to the embodiment of FIG. 3 in that the primary pump provides a controlled flow rate to a primary manifold 42, however in this instance each of the main lines downstream from the primary manifold pass through a restricted orifice 46 defining part of the metering system of the main lines. The restricted orifices 46 step the pressure down before respective throttling valves 44 downstream from the orifices. The valves 44 define the metering devices in this instance. The throttling valves may be all operated in a partially restricted manner during normal operation with balanced flow such that one side section can be less restricted and another side section more restricted corresponding to outside and inside sections of a curved path for example to vary the flow between sections while maintaining the center section mainline substantially isolated and metered at a constant rate.

Figure 4:
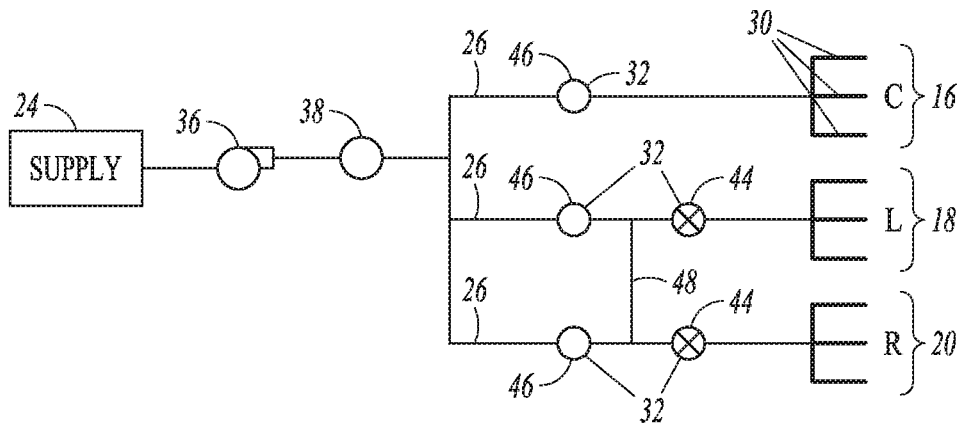

The embodiment of FIG. 4 may be arranged substantially identically to the embodiment of FIG. 5 with the exception of the metering device of the center section comprising only the restricted orifice 46 to maintain a constant metered flow rate to the center section. The remaining main lines corresponding to all of the side sections may be interconnected downstream from the restricted orifices by pressure balancing lines 48. The metering devices in this instance comprise throttling valves 44 downstream from the pressure balancing lines and the respective orifices 46 such that flow to one side section can be restricted while flow to another side section can be increased in proportion to the restriction to maintain overall flow at a constant rate as in previous embodiments while redirecting flow from one side to an opposing side of the frame.

Figure 6:
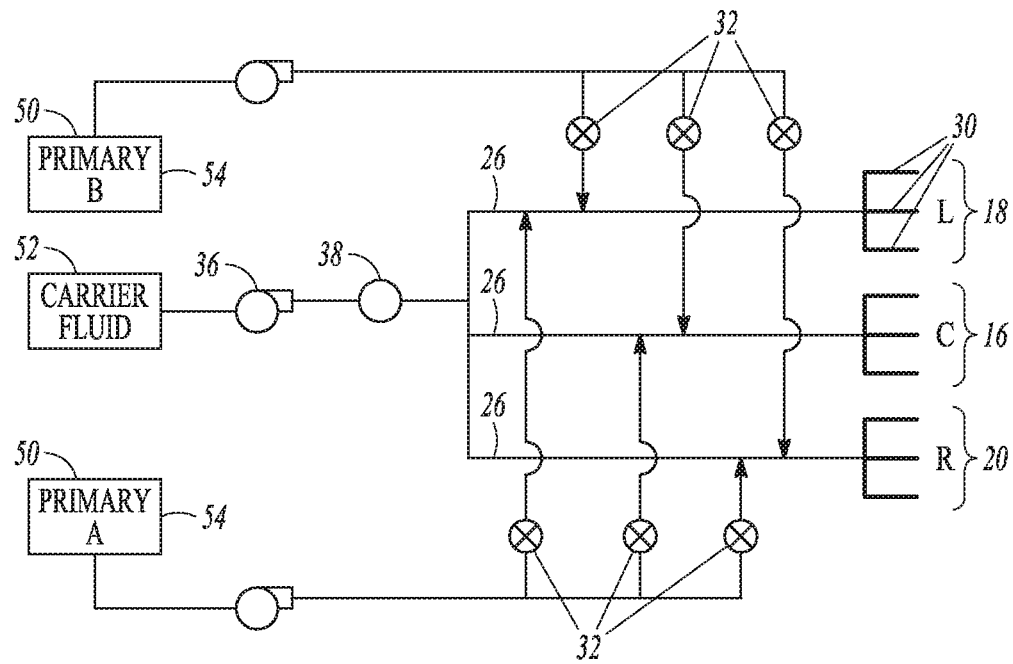
Figure 7:
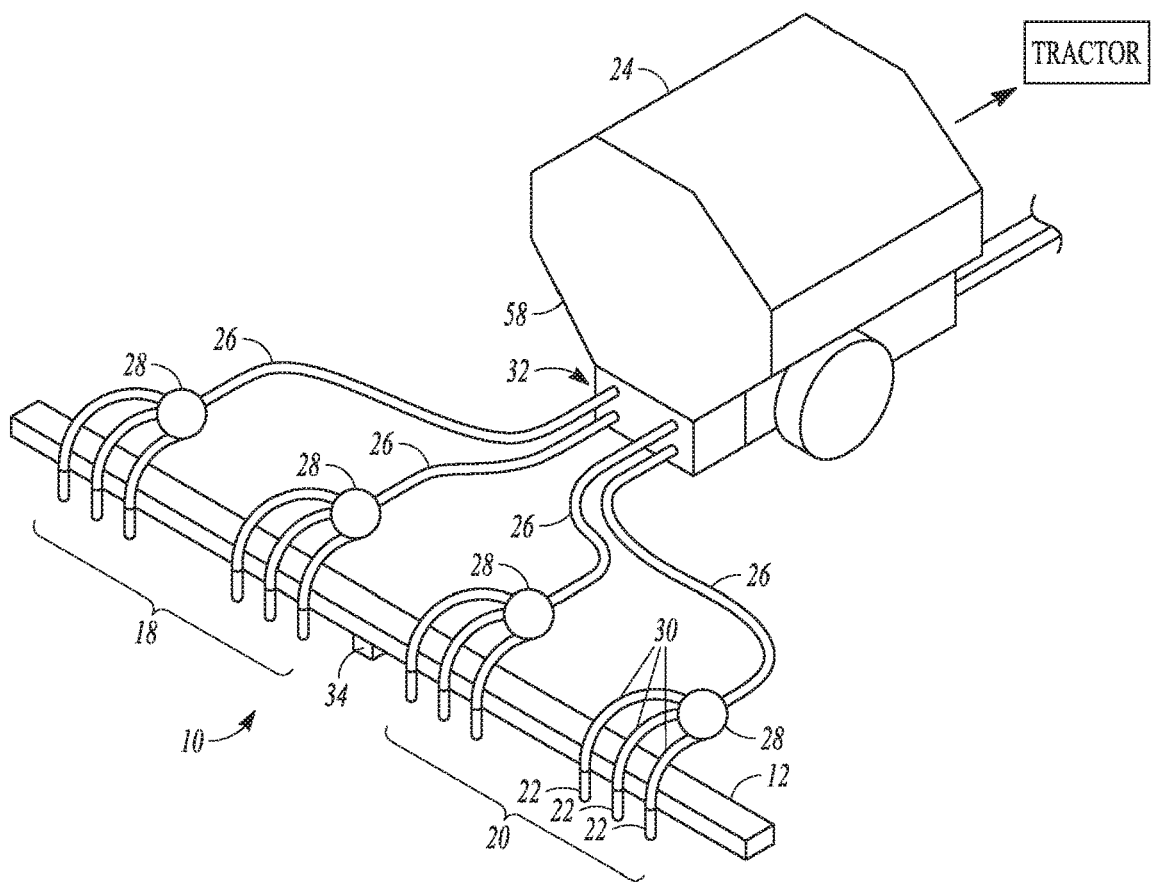
FIG. 7 is a schematic representation of one example of an agricultural air seeder to which the metering system of the present invention can be applied.

According to the embodiment of FIG. 6, a plurality of primary products 50 in the form of non diluted chemical to be applied to a field can be independently metered in concentration relative to a carrier fluid dispensed through the conveying lines. In this instance a main tank 52 of the sprayer comprises a carrier fluid supply connected by main lines 26 to the individual conveying lines 30 and subsequently the individual dispensers 22 substantially in the usual manner by supplying the carrier fluid therethrough from a primary pump 36 with an associated flow rate sensor 38.

Each primary product 50 includes its own product tank 54 which is connected to and supplies respective metering devices 32 associated with each main line of the carrier fluid and associated with each primary product. One metering device is thus associated with each primary product of each main line. Accordingly when there are two primary products as in the illustrated embodiment for communication with three main lines a total of 6 metering devices are used for metering each primary product into each main line.

Each metering device comprises a metered injector which is operable at a specified injection rate so as to be arranged to inject a metered amount of the primary product into the carrier fluid conveyed through the respective main line of a respective designated frame section independently of the other metering devices relating to other primary product or other main lines. The amount of carrier fluid remains constant in this instance but the concentration of primary products is varied so as to remain substantially constant within each center section, but can be increased or decreased in the side sections corresponding to inner or outer portions of a curved path, or all maintained at a constant concentration during normal longitudinal movement of the sprayer.

Turning now to embodiments of FIGS. 7 through 10 the implement in this instance comprises an air seeder such that the product supply comprises one or more tanks supported on a seed cart on wheels towed separately from the implement frame which comprises an air drill frame. The air drill frame includes pneumatic main lines and conveying lines for supplying particulate material to respective dispenser tubes of the dispensers. Each dispenser comprises a cultivator shovel or disc for forming a respective furrow with which the dispenser tube is aligned for depositing the metered particulate material therethrough into the furrow.

The product supplies typically include respective hopper bottoms 58 which direct the particulate material therein downwardly to respective metering wheels which define the metering devices. The metering wheels typically comprise wheels with axially oriented channels about the outer surface at circumferentially spaced positions for metering an amount of particulate material received in the channels from the tank thereabove to the pneumatic main lines below at an adjustable rate depending upon the rate of rotation of the metering devices.

Figure 8:
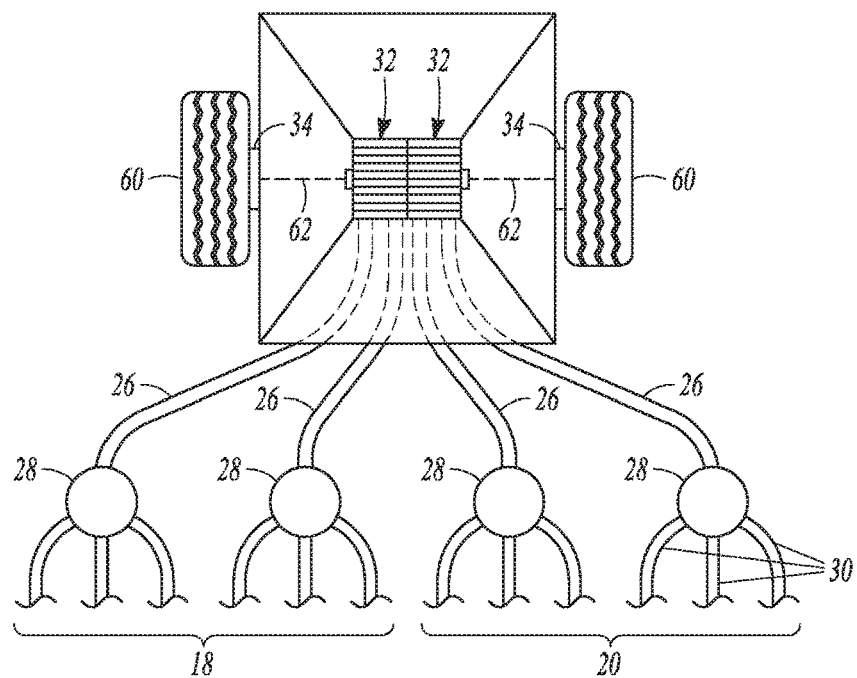
FIGS. 8 through 10 each schematically illustrate one respective embodiment of the metering system of the present invention applied to an agricultural air seeder.

Turning now particularly to the embodiment of FIG. 8, the frame in this instance is divided into only two side sections corresponding to a left section and a right section. A single metering wheel is provided within a common tank which is split into a left section wheel and a right section wheel arranged to be rotated at independent rates for independently metering product to main lines therebelow associated with the left side sections or right side sections respectively. In the embodiment of FIG. 8 the seed cart is supported on laterally spaced apart left and right wheels 60 such that each section of the metering wheel defining one of the metering devices 32 is coupled by a suitable linkage to the respective one of the two wheels 60 of the cart so that the rotation of the metering device is proportional to the respective wheel with which it is associated. When passing through a curved section one wheel will thus rotate faster than the other so that the corresponding section of the metering wheel will rotate faster resulting in more product being metered to the side of the frame with a greater forward ground speed.

Figure 9:
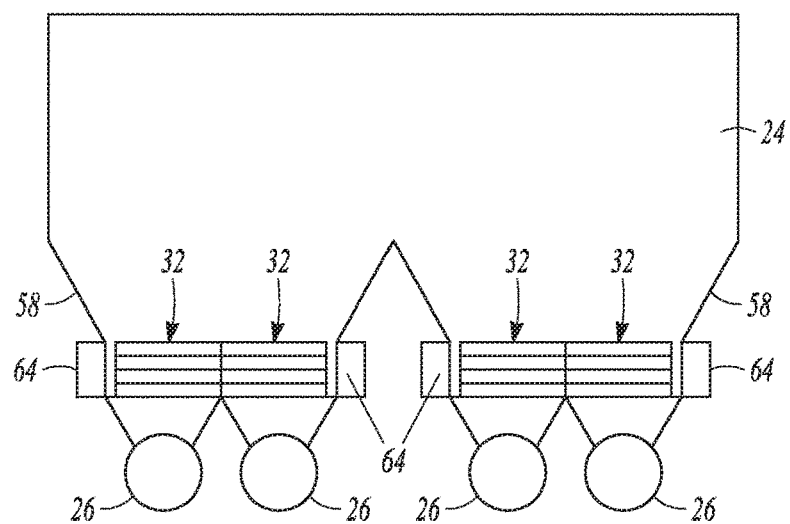

Turning now to the embodiment of FIG. 9 each separate tank on a seed cart may be designated into a greater number of individual metered sections by separating a bottom of the tank into a plurality of separate hopper bottoms which commonly communicate with a common tank area thereabove. Each separate hopper bottom 58 permits a split metering wheel to be supported therein comprising two axially abutted sections of wheel rotated about a common axis at independent rates. Each separate section of metering wheel defines a respective metering device 32 in communication with a respective main line. Each section of metering wheel is driven to rotate at its respective set rate proportional to its respective input speed determined by the computer controller by a respective control 64 which controls the rate of that section of the metering wheel which in turn controls the rate delivered to the main line and thus the rate to all of the product dispensers of the respective designated frame section associated therewith. In the illustrated embodiment two hopper bottoms of a common tank are provided with two sections of metering wheel within each hopper bottom such that four independent metering devices 32 independently meter product from a common tank to four independent main lines directed towards different sections of the frame. The different sections may include two left side sections and two right side sections, or two center sections and one left section and one right section as examples.

Figure 10:
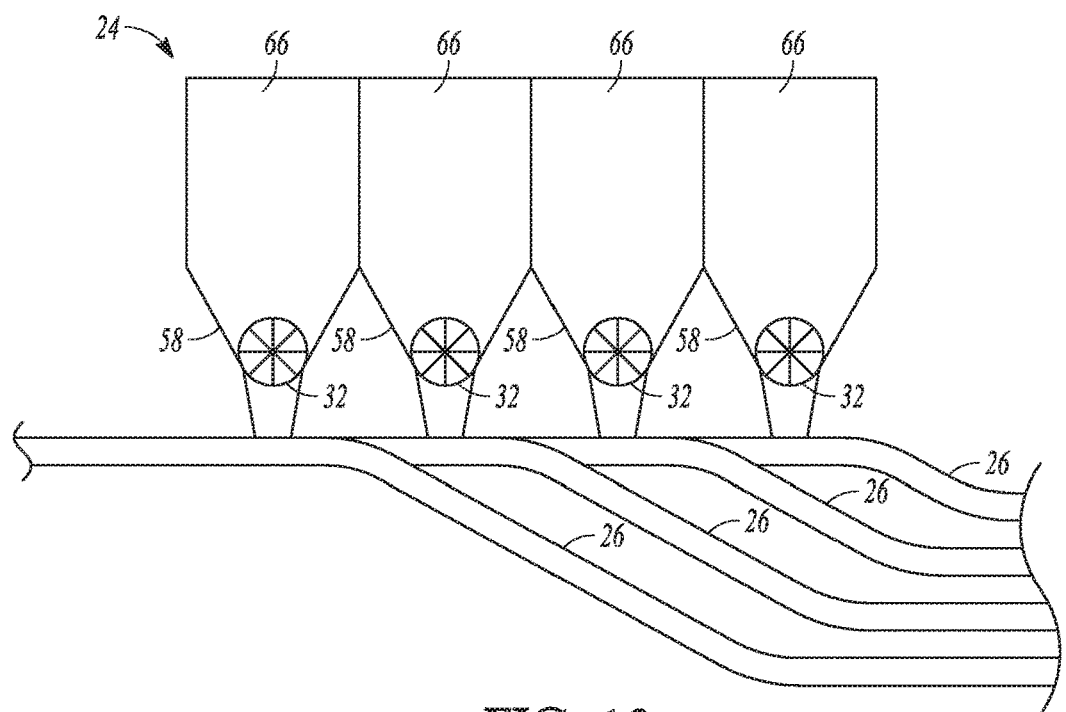

Turning now to the embodiment of FIG. 10, in further arrangements, the product supply 24 may comprise a plurality of individual tanks 66 on the seed cart in which each tank is provided with its own respective metering device 32 associated only with that tank for communication with only main lines associated with one common frame section of the implement frame. In this instance each tank is only associated with one frame section such that the metering system of that tank only meters product to the designated frame section. By operating the metering systems of the different tanks independently of one another, independent metering is again provided to different sections of the implement frame.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An implement for applying at least one agricultural product fluid comprising:
a main tank configured to hold a carrier fluid;
a primary pump in communication with the main tank;
at least one product tank configured to hold an injection product;
two or more product dispensers configured to dispense a mixture of the carrier fluid and the injection product as the at least one agricultural product fluid;
at least two main lines in communication with the main tank, each of the main lines extends between a manifold and at least one of the two or more product dispensers associated with the respective main line; and
at least two metering interfaces in communication with the at least one product tank, each metering interface includes:
a fluid connection with the at least one product dispenser associated with one of the at least two main lines, the fluid connection is proximate to the associated at least one product dispenser; and
a metering device interposed between the fluid connection and the at least one product tank, and the metering device is configured to control the injection of the injection product to the carrier fluid at the fluid connection.

2. The implement of claim 1, wherein the metering device of each metering interface is configured to independently control the flow rate of the injection product relative to metering devices of the other metering interfaces.

3. The implement of claim 1, wherein the metering device of each metering interface is configured to independently control the concentration of the injection product in the carrier fluid relative to metering devices of the other metering interfaces.

4. The implement of claim 1, wherein the two or more product dispensers includes first and second sets of product dispensers, and the first set of product dispensers are associated with a first designated frame section and the second set of product dispensers are associated with a second designated frame section.

5. The implement of claim 4, wherein the at least two metering interfaces includes first and second metering interfaces;
the first metering interface is in communication with the first set of product dispensers; and
the second metering interface is in communication with the second set of product dispensers.

6. The implement of claim 1, wherein the metering device includes a metering pump configured to control the injection of the injection product to the carrier fluid at the fluid connection.

7. The implement of claim 1, wherein the metering device includes a throttling valve configured to control the injection of the injection product to the carrier fluid at the fluid connection.

8. The implement of claim 7, wherein the throttling valve includes a pressure reducing valve, a three way valve or a restricted orifice.

9. The implement of claim 1, wherein the two or more product dispensers includes two or more spray nozzles.

10. The implement of claim 1, wherein the fluid connection and the metering device of each metering interface are proximate to the at least one product dispenser associated with the respective main line.

11. The implement of claim 1, wherein the fluid connection and the metering device of each metering interface are immediately adjacent to the at least one product dispenser associated with the respective main line.

12. The implement of claim 1 comprising the at least one agricultural product fluid including a mixture of the carrier fluid and the injection product based on the controlled injection of the injection product to the carrier fluid at the fluid connection.

13. An implement for applying at least one agricultural product fluid comprising:
   a main tank configured to hold a carrier fluid;
   a primary pump in communication with the main tank;
   at least one product tank configured to hold an injection product;
   first and second sets of product dispensers, each of the first and second sets of product dispensers includes one or more product dispensers;
   at least first and second main lines in communication with the main tank, the first main line extending between a manifold and the first set of product dispensers and the second main line extending between the manifold and the second set of product dispensers;
   wherein each of the first and second main lines includes a respective metering interface configured to independently administer the injection product to the first or second set of product dispensers associated with the respective first or second main line, and each of the metering interfaces includes:
   a fluid connection with the first or second set of product dispensers associated with the respective first or second main line, the fluid connection is proximate to the respective first or second set of product dispensers; and
   a metering device configured to independently control the injection of the injection product to the carrier fluid at the fluid connection.

14. The implement of claim 13, wherein the metering device of each metering interface is configured to independently control the flow rate of the injection product to the respective first or second main line relative to the metering devices of other metering interfaces.

15. The implement of claim 13, wherein the metering device of each metering interface is configured to independently control the concentration of the injection product in the carrier fluid of the respective first or second main line relative to the metering devices of other metering interfaces.

16. The implement of claim 13, wherein the first and second sets of product dispensers include the first set of one or more product dispensers associated with a first designated frame section of the implement and the second set of one or more product dispensers associated with a second designated frame section of the implement.

17. The implement of claim 13, wherein the metering device includes a metering pump configured to independently control the injection of the injection product to the carrier fluid at the fluid connection.

18. The implement of claim 13, wherein the metering device includes a throttling valve configured to independently control the injection of the injection product to the carrier fluid at the fluid connection.

19. The implement of claim 13, wherein the product dispensers of the first and second sets of product dispensers includes spray nozzles.

20. The implement of claim 13, wherein the fluid connection and the metering device of each metering interface are proximate to the associated first or second sets of product dispensers of the respective first or second main lines.

21. The implement of claim 13, wherein the fluid connection and the metering device of each metering interface are immediately adjacent to the associated first or second sets of product dispensers of the respective first or second main lines.

22. The implement of claim 13 comprising the at least one agricultural product fluid including a mixture of the carrier fluid and the injection product based on the independently controlled injection of the injection product at the respective fluid connection of the respective first or second main line.

23. A method for mixing an agricultural product solution comprising:
   delivering a carrier fluid from a main tank along two or more main lines, each of the two or more main lines having one or more product dispensers;
   delivering an injection product from a product tank toward fluid connections associated with the respective main lines, the fluid connections proximate to the one or more product dispensers associated with the respective main lines;
   introducing the injection product to the carrier fluid of at least one of the two or more main lines, introducing includes:
   controlling a flow rate of the injection product to at least one of the fluid connections with a metering device; and
   injecting the controlled injection product to the carrier fluid at the at least one fluid connection to achieve a specified concentration of the injection product based on the flow rate, the agricultural product solution includes the carrier fluid and the injection product injected to the carrier fluid; and
   applying the agricultural product solution with the specified concentration through the one or more product dispensers associated with the respective main lines.

24. The method of claim 23, wherein the two or more main lines include at least first and second main lines, and the fluid connections include first and second fluid connections associated with the first and second main lines, respectively; and
   controlling the flow rate of the injection product to the at least one fluid connection includes independently controlling the flow rate of the injection product to the first fluid connection of the first main line relative to the flow rate of the injection product to the second fluid connection of the second main line.

25. The method of claim 24, wherein injecting the independently controlled injection product to the carrier fluid at the first fluid connection includes achieving the specified concentration of the injection product in the agricultural product solution in the first main line independent of a concentration of the injection product in the second main line.

26. The method of claim 23, wherein controlling the flow rate of the injection product to the at least one fluid connection includes:
   independently controlling flow rates of the injection product to each of the fluid connections of the respective main lines and corresponding concentrations of the injection product in the agricultural product solutions of the respective main lines based on the independently controlled flow rates.

27. The method of claim 23, wherein controlling the flow rate of the injection product with the metering device includes controlling the flow rate at each of the fluid connections with respective independent metering devices.

28. The method of claim 23, wherein applying the agricultural product solution with the specified concentration through the product dispensers includes spraying the agricultural product solution with spray nozzles.

\* \* \* \* \*